Patented June 23, 1925.

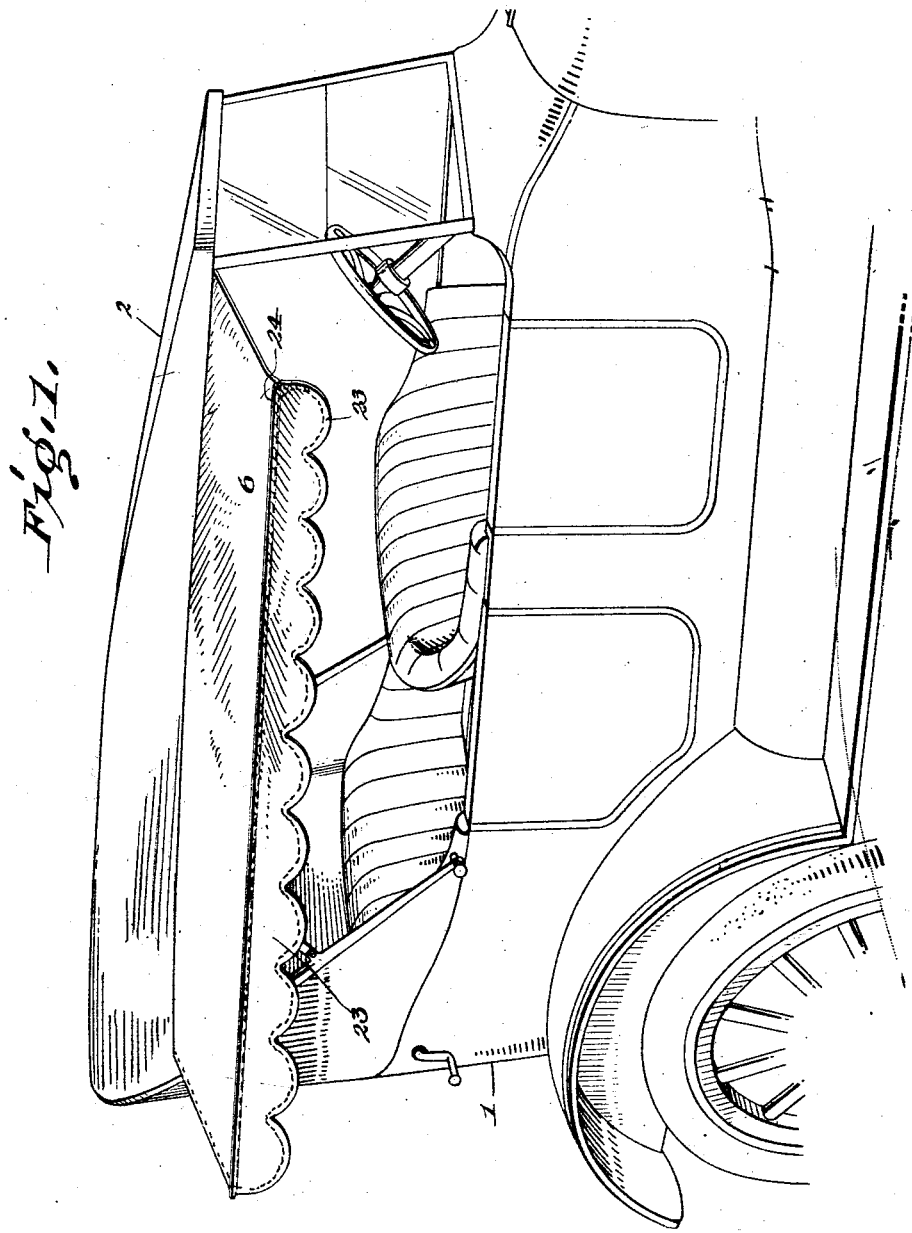

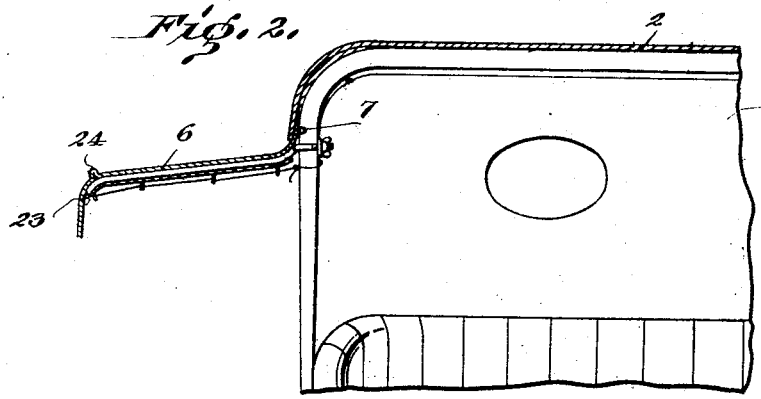
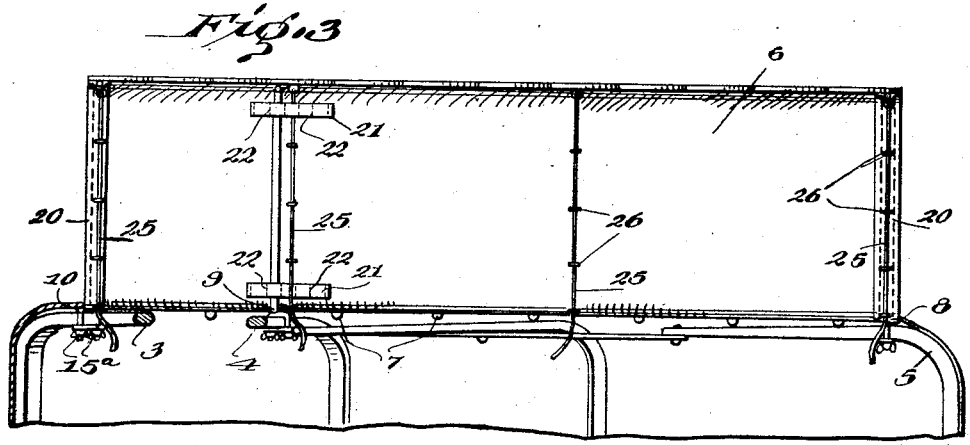
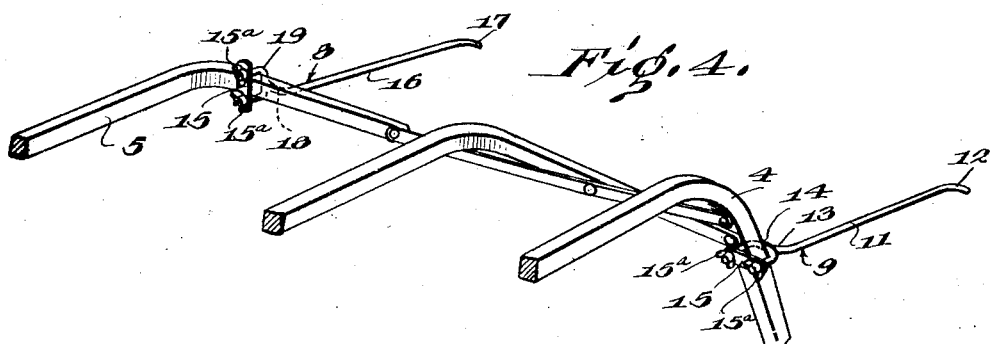

1,543,593

UNITED STATES PATENT OFFICE.

RICHARD ELLIS BENTLEY, OF SHERMAN, TEXAS.

AWNING FOR AUTOMOBILES.

Application filed December 21, 1923. Serial No. 682,019.

*To all whom it may concern:*

Be it known that I, RICHARD E. BENTLEY, a citizen of the United States, and a resident of Sherman, in the county of Grayson and State of Texas, have invented certain new and useful Improvements in Awnings for Automobiles, of which the following is a specification.

My invention relates to improvements in awnings for automobiles, and it consists in the constructions, combinations and arrangements herein described and claimed.

An object of the invention is to provide an awning which is readily attachable to the top of an automobile and adapted to be supported by the automobile top to extend laterally of the side edge of the automobile top for the purpose of shielding the occupants of the automobile and the interior of the latter from the rays of the sun, rain and the like.

A further object of the invention is to provide an awning of the character described which comprises relatively few parts, is economical to manufacture and thoroughly practical commercially.

Other objects and advantages will be apparent from the following description, considered in conjunction with the accompanying drawings, in which:

Figure 1 is a perspective view, showing an automobile equipped with an awning embodying the invention:

Figure 2 is a fragmentary vertical sectional view of a portion of the automobile top, showing the awning applied thereto:

Figure 3 is a horizontal sectional view of the structure shown in Figure 2, looking upward; and Figure 4 is a fragmentary perspective view, showing associated elements of the automobile top and awning supporting structure.

In Figure 1, 1 designates an automobile having a top 2 supported on the body thereof by any suitable supporting frame structure which includes spaced apart substantially vertically disposed bows such as those indicated respectively at 3 and 4 in Figure 3 and a horizontally disposed bow adjacent to the front of the automobile top, such as that indicated at 5 in Figures 3 and 4. The horizontally disposed bow 5 includes a portion which extends transversely of the automobile top in spaced relation to the vertically disposed bow 3 and adjacent to the front of the automobile top, as is usual. The vertically disposed bows 3 and 4 also include top portions which extend transversely of the automobile top.

In carrying out my invention, I provide an awning which includes a body 6 made of any suitable material, such as a closely woven fabric or waterproof material. The fabric body 6 may be substantially rectangular in shape, as shown and is arranged with one longitudinal edge portion thereof inserted between the longitudinal edge portion of the automobile top 2 and the supporting bows 3, 4 and 5, the inserted edge portion of the awning body being secured to the automobile top 2 by any suitable fastening means such as those indicated at 7, whereby the awning body will cooperate with the automobile top to prevent the entrance of rain, dust or the like between the adjacent edges of the awning body and the automobile top.

The awning body 6 is supported in position to extend laterally of the automobile top through the agency of bracket members, indicated respectively at 8, 9 and 10 in Figure 3. The bracket members 9 and 10 are identical to each other in essential respects and each has the form of a rod comprising a substantially straight supporting portion 11 merged at its outer end into a downwardly turned end portion 12 and merged at its inner end by a curved portion 13 into a forked attaching portion 14 which is offset in respect to the supporting portion 11. Each attaching portion 14 is firmly secured to the substantially vertical portion of one of the bows 3 or 4 by a clamping device which may be a plate 15 having openings receiving the ends of the forks of the attaching portion 14 and being held against the bow with which it is associated by nuts 15$^a$ which threadedly engage the end portions of said forks, whereby the supporting portion 11 of that particular bracket member will extend laterally of the vehicle top and will be slightly inclined downwardly toward its outer end. The bracket member 8 also includes a substantially straight supporting portion, indicated at 16 which is approximately equal in length to the supporting portion 11 and is merged at its outer end into a downwardly turned portion 17. The latter is similar to each of the downwardly turned end portions 12. The supporting portion 16 is merged at its inner end by a curved connecting portion 18 into a forked attaching portion 19. With this arrangement, the attaching portion 19 may be firmly secured by one of the clamping plates 15 and nuts 15ª against the side portion of the horizontal bow 5 and the connecting portion 18 will extend rearwardly and downwardly so that the supporting portion 16 will extend below the level of the bow 5 laterally of the automobile top and in parallel relation to the supporting portions 11 of the bracket members 9 and 10.

The awning body 6 is provided with transversely extending sleeves 20 at the ends thereof receiving the supporting portions and downwardly turned end portions of the bracket members 8 and 10. Two parallel strips 21 are secured to the fabric body 6 to depend therefrom, such strips being located along the side edges of the fabric body and being somewhat nearer to the rearward end of the fabric body than to the forward end thereof. The strips 21 have series of openings or loop portions 22, the corresponding openings 22 being in alinement transversely of the awning body. The bracket member 9 may extend through any two alined openings 22 for the purpose of supporting the fabric body intermediate its ends. The spacing of the bow 4 from the bows 3 and 5 may vary somewhat in automobiles of different types of construction and therefore, a plurality of sets of alined openings 22 are provided to receive the bracket member 9 when the latter is attached in the manner described to the bow 4 of an automobile of any one of a plurality of different types of construction. The awning body 6 thus will be maintained substantially taut from one end thereof to its other end and between its outer longitudinal edge and its juncture with the automobile top and sagging of the awning body will be precluded. Since the supporting portions of the respective bracket members are inclined downwardly toward their outer ends it will be obvious that rain, snow, or the like falling upon the awning body will drain or slide therefrom over the outer edge of the awning. The awning body may be of sufficient width to provide the pendant flap 23 at the outer edge thereof.

The fabric body 6 of the awning may have a reinforcing seam provided along the outer edge thereof, as indicated at 24. Also, draw strings 25 may be secured to the fabric body at spaced apart points along the outer edge thereof and then extended transversely across the fabric body through guiding and retaining eyes 26. The free inner ends of the strings 25 normally are attached to any convenient support, as for instance to the supporting bows of the automobile top, and may be grasped and manipulated to draw the fabric body back along the supporting bracket arms to folded position against the adjacent edge of the automobile top.

The awning, of course, is complete in itself and may be attached to and removed from an automobile whenever desired. The awning when in attached position does not prevent the placing of the usual curtains in operative position or interfere in any way with the adjustment or manipulation of the automobile top in an ordinary manner.

The awning when attached to the vehicle top in the manner described will shield the occupants of the vehicle from the direct or indirect rays of the sun and will also prevent rain, sleet or the like from blowing into the automobile body as well as protecting the upholstery and interior furnishings of the automobile body from the weather.

Obviously my invention is susceptible of embodiments in forms other than that illustrated in the accompanying drawings, and I, therefore, consider as my own all modifications and adaptations thereof which clearly fall within the scope of the appended claims.

I claim:

1. An awning for automobiles comprising an awning body having transversely extending sleeves at the ends thereof, parallel attaching strips depending from the longitudinal edge portions of the awning body intermediate the ends thereof, said attaching strips having series of openings formed therethrough, corresponding openings of the two strips being alined transversely of the awning body, and three separate bracket members attachable at their inner ends to spaced apart bows of an automobile top and having parallel spaced supporting portions extending laterally of a longitudinal edge of the automobile top, the supporting portions of the end bracket members being received in the sleeve portions of the awning body and the supporting portion of the middle bracket extending through alined openings of said attaching strips for supporting the awning body intermediate its ends.

2. In an awning for an automobile top having spaced apart supporting bows, an awning body made of a flexible material, a plurality of bracket members respectively attachable to separate bows of the automobile top for supporting the awning body in position to extend laterally outward from the automobile top, each of said bracket members comprising an elongated rod-like body merged at its inner end by a curved portion into a forked attaching portion, the forks of said attaching portion being adapted to straddle a portion of one of said bows, a clamping plate having openings through which the end portions of the forks extend, and securing devices engaging the extreme end portions of the forks for clamping the attaching portion of the bracket member to said one bow, said rod-like body of the bracket member having the other end portion thereof inclined downwardly from its juncture with the remaining portion of said rod-like body.

RICHARD ELLIS BENTLEY.